United States Patent
Küchler et al.

(10) Patent No.: US 12,313,766 B2
(45) Date of Patent: May 27, 2025

(54) RADAR SYSTEM, A RADAR ARRANGEMENT, AND A RADAR METHOD FOR CONCURRENT RADAR OPERATIONS

(71) Applicant: NXP B.V., Eindhoven (NL)

(72) Inventors: Wolfgang Küchler, Graz (AT); Stefan Tertinek, Graz (AT); Andreas Gruber, Graz (AT)

(73) Assignee: NXP B.V., Eindhoven (NL)

( * ) Notice: Subject to any disclaimer, the term of this patent is extended or adjusted under 35 U.S.C. 154(b) by 316 days.

(21) Appl. No.: 17/819,487

(22) Filed: Aug. 12, 2022

(65) Prior Publication Data
US 2023/0080019 A1 Mar. 16, 2023

(30) Foreign Application Priority Data
Sep. 10, 2021 (EP) .................................... 21196096

(51) Int. Cl.
*G01S 7/02* (2006.01)
*G01S 7/292* (2006.01)
*G01S 13/10* (2006.01)

(52) U.S. Cl.
CPC ............ *G01S 7/0234* (2021.05); *G01S 7/292* (2013.01); *G01S 13/106* (2013.01)

(58) Field of Classification Search
CPC ....... G01S 7/0234; G01S 7/292; G01S 13/106
See application file for complete search history.

(56) References Cited

U.S. PATENT DOCUMENTS

| | | | |
|---|---|---|---|
| 11,812,341 B2 * | 11/2023 | Herschfelt | H04W 4/02 |
| 12,052,051 B2 | 7/2024 | Tertinek et al. | |
| 2003/0151542 A1 * | 8/2003 | Steinlechner | G01S 13/222 |
| | | | 342/134 |
| 2016/0154091 A1 * | 6/2016 | Yosoku | G01S 7/0232 |
| | | | 342/201 |
| 2018/0259632 A1 * | 9/2018 | Kishigami | G01S 7/2921 |
| 2019/0195984 A1 * | 6/2019 | Goda | G01S 13/931 |
| 2020/0011983 A1 * | 1/2020 | Kageme | G01S 13/325 |
| 2021/0286045 A1 * | 9/2021 | Bayesteh | H04B 7/0695 |
| 2022/0043132 A1 | 2/2022 | Kageme et al. | |

FOREIGN PATENT DOCUMENTS

| | | |
|---|---|---|
| CN | 106908773 B | 1/2020 |
| CN | 111736141 A | 10/2020 |
| CN | 112737998 A | 4/2021 |
| CN | 110531323 B | 8/2021 |
| EP | 3267215 A1 * | 1/2018 ........... G01S 5/0226 |

OTHER PUBLICATIONS

Luke, H.D., "Sequences and Arrays with Perfect Periodic Correlation", IEEE Transactions on Aerospace and Electronic Systems, vol. 24, No., May 3, 1988.

* cited by examiner

*Primary Examiner* — Timothy A Brainard
*Assistant Examiner* — Kenneth W Good (57) ABSTRACT systems and methods include a transmitter with a control unit that is configured to generate a code, including data identifying a plurality of regions and a transmitter-specific cyclic shift scheme. The cyclic shift scheme results in a re-arrangement of the regions (using a change of time offset) that is different (transmitter-specific) for each of the transmitters. The transmitter generates a signal based on the code and transmits the signal via an antenna. The radar system includes a receiver configured to receive an echo of the signal via a second antenna that is reflected from a target and identifies the transmitter from the echo based on the transmitter-specific cyclic shift scheme.

20 Claims, 4 Drawing Sheets

RADAR SYSTEM, A RADAR ARRANGEMENT, AND A RADAR METHOD FOR CONCURRENT RADAR OPERATIONS

CROSS-REFERENCE TO RELATED APPLICATIONS

This application claims the priority under 35 U.S.C. § 119 of European Patent application no. 21196096.8, filed on 10 Sep. 2021, the contents of which are incorporated by reference herein.

TECHNICAL FIELD

The present disclosure relates to a radar system comprising a transmitter and a receiver. Further, the disclosure relates to a radar arrangement that comprises the radar system, and a further transmitter/receiver. Furthermore, the disclosure relates to a method of performing a radar operation, in particular including the radar system and/or the radar arrangement. Thus, the present disclosure may refer to the technical field of radar operations.

TECHNICAL BACKGROUND

Radar operations apply radio waves to determine properties such as distance, angle, or velocity of a target (object or person of interest). Thereby, a transmitter emits a radio wave signal to the target, while a receiver obtains an echo of the signal that has been reflected by the target. However, in case that a plurality of transmitters (and receivers) are involved in a radar operation, concurrency between the devices may become an issue. Especially interferences from concurrently operating radar systems may be seen as a growing problem, since radar systems are integrated in an ever-growing number of consumer devices (e.g. in cars for autonomous driving, in smartphones for face recognition, and in smart utilities for gesture recognition). Thus, minimizing or even avoiding interferences between concurrent radar systems may be considered an important issue.

In order to avoid interferences, conventional radar systems may use a code sequence of repeating code symbols with pronounced cyclic correlation properties. This allows the receiver to correlate the received code sequence with the emitting transmitter. However, these code sequences may tend to have sub-optimal cross-correlation properties, meaning that devices, which use different codes, may still severely disturb each other.

OBJECT AND SUMMARY OF THE DISCLOSURE

It is an object of the present disclosure to enable an efficient operation of concurrent radar systems (in particular preventing interferences).

In order to achieve the object defined above, a radar system, a radar arrangement, and a method according to the independent claims are provided.

According to an aspect of the present disclosure, there is described a radar system, comprising:
i) a transmitter configured to: a) provide a code (in particular a code comprising a sequence of code symbols), b) identify a plurality of regions within the code (in particular within at least one code symbol, more in particular in the majority of code symbols, more in particular in each code symbol), c) apply a transmitter-specific cyclic shift scheme to the plurality of regions, d) generate a signal from the code and transmit the signal, and
ii) a receiver, configured to: a) receive an echo of the signal, and
iii) identify the transmitter based on the transmitter-specific cyclic shift scheme.

According to a further aspect of the present disclosure, there is described a radar arrangement, comprising:
i) a radar system as described above,
ii) a further transmitter configured to: a) provide a further code (which may be identical to the above described code), b) identify a further plurality of regions (which may be identical or different to the above identified regions) within the further code, c) apply a further transmitter-specific cyclic shift scheme/which may be different from the above described transmitter-specific cyclic shift scheme) to the further plurality of regions, d) generate a further signal from the further code and transmit the further signal, and/or
iii) a further receiver, configured to a) receive the echo of the signal and/or an echo of the further signal, and b) identify the transmitter based on the transmitter-specific cyclic shift scheme and/or identify the further transmitter based on the further transmitter-specific cyclic shift scheme.

According to a further aspect of the present disclosure, there is described a method of performing a radar operation, in particular including a plurality of transmitters and receivers, the method comprising:
i) generating a code,
ii) identifying a plurality of regions within the code,
iii) applying a transmitter-specific cyclic shift scheme to the plurality of regions,
iv) generating a signal from the code and transmitting the signal,
v) receiving an echo of the signal, and
vi) identifying a specific transmitter based on the transmitter-specific cyclic shift scheme.

In the context of the present document, the term "code" may in particular refer to any kind of information that has been converted (encoded) in a specific manner and can be transmitted (and received). A code may comprise a code sequence of the encoded information. Hereby, an information may be encoded as a so-called "code symbol". The term "(code) symbol" may particularly denote a (discrete) piece of information (or data) that is contained in a (radiofrequency) signal (i.e. waves in the electromagnetic spectrum). A symbol may also be called a character or a string (of characters). A code sequence may then comprise at least one code symbol, in particular a plurality of code symbols. After communication, the code may be decoded (from code symbol to information) to obtain again the original information. In an example, a code may comprise a sequence of code symbols, wherein each code symbol comprises one or more encoded bits. Encoding may be done using digital modulation, for example phase-shift keying (PSK). A code may also comprise a training sequence. Examples of code symbol types may include a binary, ternary, or higher order scheme.

In the context of the present document, the term "region" may in particular refer to any part, portion or segment of the code, which is defined in a specific manner. For example, there may be defined three code regions of similar length along the length of a code. In an example, the code comprises a plurality of code symbols and at least two regions are defined in at least one of said code symbols, in particular all of said code symbols. The term "identifying regions" may thus refer to a step of assigning (defining) specific portions of the code (in particular of the code symbols) to specific regions. In an embodiment, the number of regions may correspond to the number of transmitters used in a radar operation. While in one example, the regions may be identified within a code symbol, in another example, the regions may be identified within a training sequence code.

In the context of the present document, the term "cyclic shift" (an alternative term may be "phase shift") may in particular refer to an operation of changing the position of at least one region of a code. In particular, a cyclic shift may exchange the code positions of at least two regions with each other in the code. Thus, a "cyclic shift scheme" may denote a scheme of (re-) arranging the regions of the code in a specific order. Such a cyclic shift may provide a time offset to the specific regions. In a preferred example, the cyclic shift scheme is "transmitter-specific", i.e. a specific transmitter may be identified based on the cyclic shift scheme that has been applied to the code, transmitted by said transmitter. For example, in a radar system with a plurality of transmitters, each transmitter may comprise a different transmitter-specific cyclic shift scheme. Thus, even though the code may be the same for each transmitter, the different transmitter-specific cyclic shift schemes may enable an identification of each specific transmitter.

In an example, the transmitters of a radar arrangement are using the identical code but with a cycle (phase) shift of Mn, with n=0 . . . N−1. In a general case, a transmitter n may use a phase shift of $L/N*Mn$ with $Mn \in \{0, 1, \ldots, N-1\}$, Mn Mk ∀ n k. In a special case, all regions may have identical sizes, wherein the phase shift for a transmitter n is $L/N*n$ with n=0 . . . N−1.

According to an exemplary embodiment, the present disclosure may be based on the idea that an efficient operation of concurrent radar systems may be enabled, when a transmitter emits a signal with a code sequence, wherein code regions of the code sequence have been re-arranged using a cyclic shift scheme that is transmitter-specific. In this manner, even if concurrent radar operations include a plurality of transmitters (and receivers) that apply an identical code and/or transmit at similar times (synchronized operation), interferences of the concurrent transmitters may be efficiently overcome. In such a radar operation, each transmitter may comprise its own transmitter-specific cyclic shift scheme, thereby enabling concurrent (orthogonal) radar operation for (time synchronized) radar devices. The described approach may be used in a plurality of radar applications such as monostatic, multi-static, statistical MIMO, coherent MIMO. Hereby, the transmitter-specific cyclic scheme may be implemented in an especially straightforward and cost-efficient manner. Further, the described approach may reduce air-time by enabling concurrent operation, make use of known codes with good ACF properties, and use a single correlation receiver, which may lower the required energy.

Specific embodiments may for example include that a cyclically shifted code symbol (regions in the symbol) (or another kind of code segment) are repeated any number of time or that a very long code sequence is cyclic shifted. In another embodiment, there may be applied a very long code sequence (in particular with pronounced cyclic autocorrelation properties) and only a part of the code (i.e. one or more regions) are appended at the beginning and/or at the end of the code sequence (in particular to preserve the pronounced cyclic autocorrelation properties).

DESCRIPTION OF EXEMPLARY EMBODIMENTS

In the following, further exemplary embodiments of the device, the system, the method and the use will be explained.

According to an embodiment, the transmitter-specific cyclic shift scheme comprises (re-) arranging the regions of the code in a specific order, thereby providing a time offset to the regions. There may be a variety of options how to implement the arrangement of the regions. For example, regions of a symbol may be exchanged with each other, which may be done in a repeated manner. In another example, one or more regions may be arranged to specific positions of the code sequence, e.g. at the end/beginning.

According to a further embodiment, the code comprises a sequence of code symbols. According to a further embodiment, at least some of the plurality of regions are within at least one of the code symbols, in particular within the majority of code symbols, more in particular in each code symbol. In this manner, cycle-shifting the regions may be implemented in a symbol-by-symbol manner. In an example, the code sequence may comprise repetitions of only one symbol, which symbol may be cycle-shifted. In another example, the code sequence may comprise different code symbols, which are cycle shifted in the same manner or in different manners.

According to a further embodiment, the radar system further comprises a target (object of interest), wherein each region of the plurality of regions is longer (comprises a specific length) than the distance between the transmitter and the target (in other words, during transmission time to the target, only one region is analyzed).

Thereby, interference may be efficiently decreased or suppressed. In an example, as long as each region is longer than the maximal distance between transmitter (s) and target distance (plus timing jitter), the correlation peaks corresponding to a specific transmitter may be inside its assigned segment and are not interfering with the other segments. If this condition is met, it may not be required that all regions of the plurality of regions are of the same size.

In an example, factors that determine the length of the code (sequence) between a transmitter/receiver pair may include the transmitting power of the transmitter, the sensitivity of the receiver, the relative position of the transmitter/receiver (antennas), and the environment.

In a further example, the code length may determine the number of available cyclic shift operations, which can be viewed as a shared resource. To maximize system capacity (i.e. the number of concurrently operating transmitters), the efficiency of this shared resource may be optimized, such as allowing the use of an optimized region length for each individual transmitter.

According to a further embodiment, the radar system is implemented as one of a mono-static radar application, a multi-static radar application, a statistical MIMO application, a coherent MIMO application (see description of FIGS. 3 to 6 below for details). Thus, the described approach may be implemented in a variety of industry-relevant radar applications in an efficient and robust manner.

The term MIMO (multiple-input, multiple-output) may refer to a method for multiplying the capacity of a radio link using multiple transmission and receiving antennas to exploit multipath propagation. A multi-static radar uses distributed transmitters and receivers (different viewing aspect of target), while statistical MIMO uses combined transmitter-receiver on these locations (providing additional information). Coherent MIMO uses closely located transmitter-receivers (same viewing aspect of target) to enable calculation of virtual array antennas.

According to a further embodiment, the transmitter and the receiver apply the same transmitter-specific cyclic shift scheme. According to a further embodiment, the transmitter and the receiver apply a different transmitter-specific cyclic shift scheme. Depending on the desired application, a suitable configuration can be chosen. In the latter case, a receiver may identify a plurality of different transmitters using only one scheme.

According to a further embodiment, the radar system is a pulse radar system, in particular configured for transmitting and receiving ultra-wide band (UWB) signals, and echoes thereof. Thereby, the described radar system may be implemented in the growing technical field of UWB radar applications.

A specific kind of radar applies ultra-wide band (UWB) technology. The term "UWB" may refer to a radio technology that can use a very low energy level for short-range, high-bandwidth communications over a large portion of the radio spectrum. UWB may refer to a technology for transmitting information spread over a large bandwidth (>500 MHz). UWB may be defined as an antenna transmission for which emitted signal bandwidth exceeds the lesser of 500 MHz or 20% of the arithmetic center frequency. UWB transmissions may transmit information by generating radio energy at specific time intervals and occupying a large bandwidth, thus enabling pulse-position or time modulation. The range of UWB may be for example in the range of tens of meters. The basic operation of a (UWB) radar system consists of transmitting a signal with a certain code sequence and simultaneously correlating that code sequence with the received signal (echo).

According to a further embodiment, the code is at least partially configured as a training sequence which comprises a cyclic training sequence (in particular to which the cyclic-shift scheme has been applied). In general, radar operations may comprise the use of a scrambled training sequence (STS). Hereby, the STS may be (at least partially) substituted by a cyclically shifted training sequence in order to allow transmitter identification (see FIGS. 7 and 8 for further details, see further the IEEE 15.4z standard).

According to a further embodiment, the plurality of regions comprise a first code segment ("prefix", e.g. a cyclic prefix segment) at a code (sequence) position before the (above described) cyclic training sequence and/or a second code segment ("postfix", e.g. last N chips segment) at a code (sequence) position after the cyclic training sequence. Thereby, segments of the training sequence (which may be seen as a code) can be identified as regions that are cyclically shifted alternatively or additionally to a cyclic shift of the actual training sequence.

According to a further embodiment, the transmitter and the receiver are integrated in a common device. According to a further embodiment, the transmitter and the receiver are integrated in spatially separate devices.

According to a further embodiment, a code symbol encodes a plurality of bits using a digital modulation scheme. Digital modulation may comprise one of phase-shift keying (PSK, frequency-shift keying (FSK), amplitude-shift keying (ASK).

According to a further embodiment, the code comprises pronounced, in particular (essentially) ideal, auto-correlation properties, in particular wherein the auto-correlation properties are more pronounced than the cross-correlation properties. Thereby, identification properties and interference prevention may be enhanced. It may be necessary to focus either on auto-correlation properties or cross-correlation properties (since there may be a trade-off). In the present case, auto-correlation may be preferable. Codes with pronounced (perfect) autocorrelation properties but less pronounced (poor) cross-correlation properties are in general known to the skilled person. A pronounced auto-correlation may ensure that there is no influence (interference) of the other transmitters inside a region (while the cycle-shift may move a transmitter virtually to a larger distance).

An example for a code with pronounced, in particular (essentially) ideal, auto-correlation properties may be the following ternary code: −1 0 +1 +1 +1 +1 −1 −1 +1 −1 −1 +1 −1 +1 +1 +1 +1 −1 +1 −1 −1 −1 +1 +1 −1 −1 +1 +1 +1 +1 +1 +1 −1 +1 +1 −1 +1 0 0 +1 −1 −1 +1 0 −1 −1 +1 0 +1 +1 +1 +1 +1 −1 −1 +1 +1 +1 −1 −1 0 −1 −1 0 +1 −1 +1 −1 −1 −1 −1 0 −1 +1 −1 −1 +1 −1 +1 0 +1 −1 −1 +1 +1 −1 +1 −1 +1 +1 +1 0.

According to a further embodiment, the transmitter-specific cyclic shift scheme is different from the further transmitter-specific cyclic shift scheme. According to a further embodiment, the plurality of regions and the further plurality of regions are similar. According to a further embodiment, the plurality of regions and the further plurality of regions are different.

According to a further embodiment, the transmitter and the further transmitter are synchronized. In other words, the transmitters of the radar arrangement may be configured to send at the same time.

According to a further embodiment, the radar arrangement is implemented as one of the group which consists of a monostatic radar application, a multi-static radar application, a statistical MIMO application, a coherent MIMO application (see description above).

According to a further embodiment, the method further comprises: exchanging the transmitter-specific cyclic shift scheme within a transmitter-receiver pair, in particular by a ranging operation (before the radar operation). This may be an efficient approach to ensure that the receiver can identify the transmitter based on the transmitter-specific cyclic shift scheme. The cyclic shift scheme for each transmitter and receiver may be fixed and/or pre-assigned.

According to a further embodiment, the method further comprises: broadcasting the transmitter-specific cyclic shift scheme to a transmitter and/or a receiver, in particular by an independent transmitter (controller). The controller may broadcast the transmitter-specific cyclic shift scheme to all transmitters and/or receivers of a radar arrangement (in particular prior to the radar operation).

According to a further embodiment, the method further comprises updating the transmitter-specific cyclic shift scheme, in particular in a regular manner. A malicious user (attacker) may interact with the radar operation (sniff the air interface) and determine the transmitted code(s). Then, the malicious user may be enabled, for example, to manipulate the target location determined by the radar system, e.g. blocking one of the transmitters and transmitting the code with its own suitably chosen cyclic shift scheme. Such a scenario may be avoided, when the transmitter-specific cyclic shift scheme is (regularly) updated.

According to a further embodiment, updating comprises changing the cyclic shift (scheme) in a pseudo-random manner. This measure may further improve efficiency and security of the described method. For each transmitter and/or receiver, instead of using a fixed cyclic shift scheme, the cyclic shift scheme may be updated (from frame to frame) based on a secure pseudo-random sequence (PRS). This may be done in a controller or one of the transmitters/receivers. A malicious user not updating the cycling shift scheme accordingly may cause a jumping echo of a code signal at a receiver, which event may then be readily detected. The malicious user would then have to guess the correct PRS to make a successful attack, whereby the probability of success is reduced with increasing PRS length.

BRIEF DESCRIPTION OF THE DRAWINGS

The illustrations in the drawings are schematic. In different drawings, similar or identical elements are provided with the same reference signs.

DESCRIPTION OF THE DRAWINGS

Before, referring to the drawings, exemplary embodiments will be described in further detail, some basic considerations will be summarized based on which exemplary embodiments of the present disclosure have been developed.

According to exemplary embodiments of the present disclosure, orthogonality between multiple radar transmitter signals, received at a receiver, is achieved by assigning a code symbol with ideal autocorrelation properties to each transmitter with a different cyclic shift, thereby separating the codes from each transmitter to the receiver via a time-offset (cyclic shift). The present disclosure elegantly and efficiently solves the interference issue, in particular for time synchronized UWB devices.

According to exemplary embodiments of the present disclosure, key features can include:
- using code symbol(s) with pronounced/ideal autocorrelation properties,
- assigning to each transmitter a cyclic shifted version of at least one code symbol,
- operating the devices (transmitters) in a time synchronized manner,
- defining a cyclic shift that is large enough, such that the CIR responses do not overlap,
- the receivers can either correlate with the original code symbol or the cyclically shifted version of the code symbol,
- the receivers can separate the CIRs to each transmitter by a time-offset corresponding to the cyclic shift to these transmitters.

Figure 1:
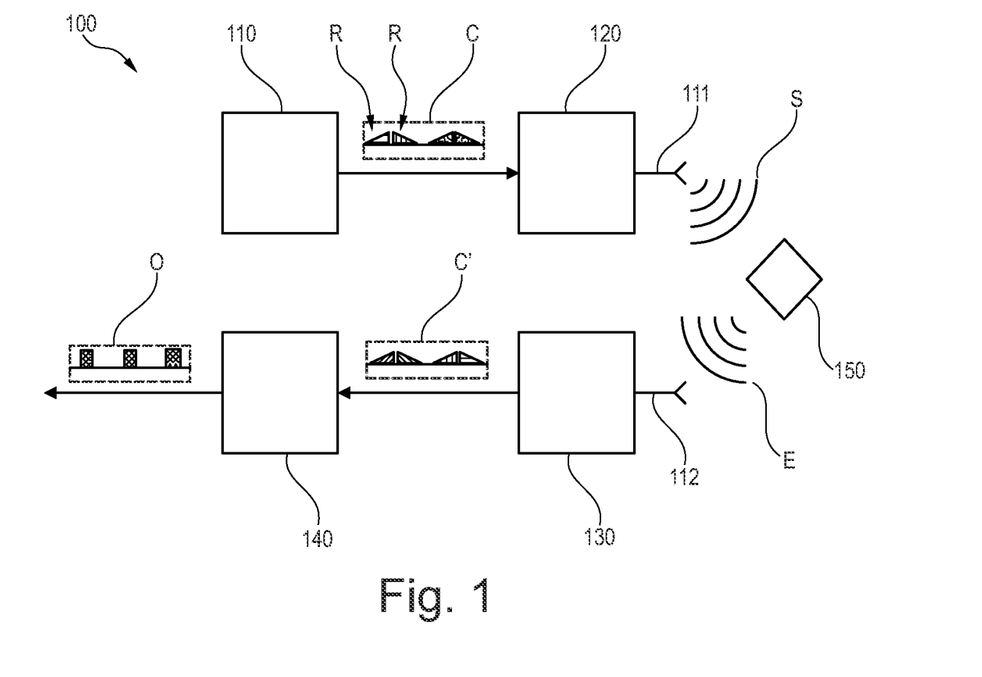
FIG. 1 illustrates a radar system according to an exemplary embodiment of the present disclosure.

FIG. 1 is a schematic illustration of a radar system 100 according to an exemplary embodiment of the present disclosure. The radar system 100 comprises a transmitter 120 with a control unit 110 which is configured for generating a code C. A plurality of regions R are identified within the code C, and a transmitter-specific cyclic shift scheme is applied to the plurality of regions (see FIG. 2 below for details). The transmitter 120 is configured for generating a signal S from the code C, and further configured for transmitting the signal S via an antenna 111. The radar system 100 further comprises a receiver 130, configured for receiving an echo E of the signal S via a further antenna 112. Hereby, the signal S is reflected from a target 150 (object of interest) as the echo E. After receiving, the receiver 130 identifies the transmitter 120 based on the transmitter-specific cyclic shift scheme. The receiver 130 can be associated with a correlator 140, configured for correlating the code C' of the received echo E with a code template. The radar system 100 is further configured, as is exemplary shown in FIG. 1, to produce an output signal (in particular a correlator output O), which may, for example, be a visual output, or in general, any digital or analogue output for further processing. For example, once the echo E has been received, it may be demodulated, e.g. by a higher order digital modulation method according to exemplary embodiments.

Figure 2:
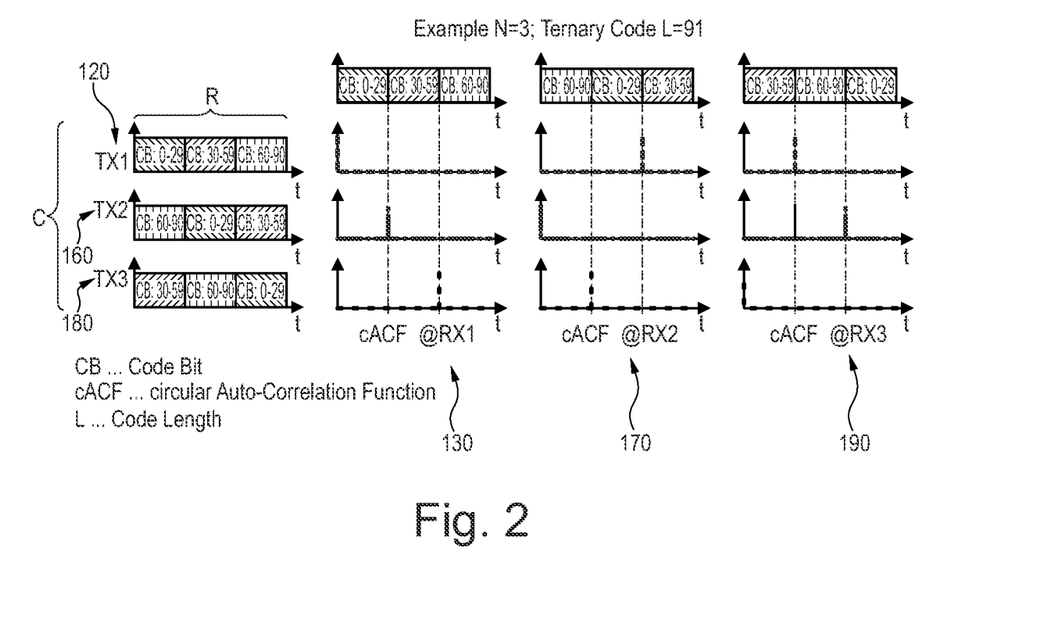
FIG. 2 illustrates code sequences with cyclic shifted regions according to an exemplary embodiment of the present disclosure.

FIG. 2 illustrates code sequences with cyclic shifted regions according to an exemplary embodiment of the present disclosure. There are shown three codes C for a first transmitter 120, a second transmitter 160, and a third transmitter 180, respectively (number N of transmitters=3). Each code comprises a code symbol within a code sequence, wherein the code symbol encodes a plurality of bits (in this example, the code length L is 91 bits). The code symbol is identical for all three transmitters 120, 160, 180, nevertheless, a plurality of regions R have been identified within the code C, and a transmitter-specific cyclic shift scheme has been applied to the plurality of regions R. The cyclic shift scheme results in a re-arrangement of the regions (change of time offset) that is different (transmitter-specific) for each of the transmitters 120, 160, 180. Corresponding receivers 130, 170, 190 can thereby clearly identify each transmitter 120, 160, 180 based on the transmitter-specific cyclic shift schemes.

FIGS. 3 to 6 respectively illustrate a radar arrangement 200 according to an exemplary embodiment of the present disclosure. The radar arrangement 200 comprises a radar system 100 as described for FIG. 1 and two further radar systems, each comprising:
i) a further transmitter 160, 180 configured to provide a further code (can be similar to the code), identify a further plurality of regions within the further code, apply a further transmitter-specific cyclic shift scheme to the further plurality of regions, generate a further signal from the further code and transmit the further signal, and
ii) a further receiver 170, 190, configured to receive the echo of the signal and/or an echo of the further signal, and identify at least one transmitter 120, 160, 180 based on the transmitter-specific cyclic shift scheme.

Figure 3:
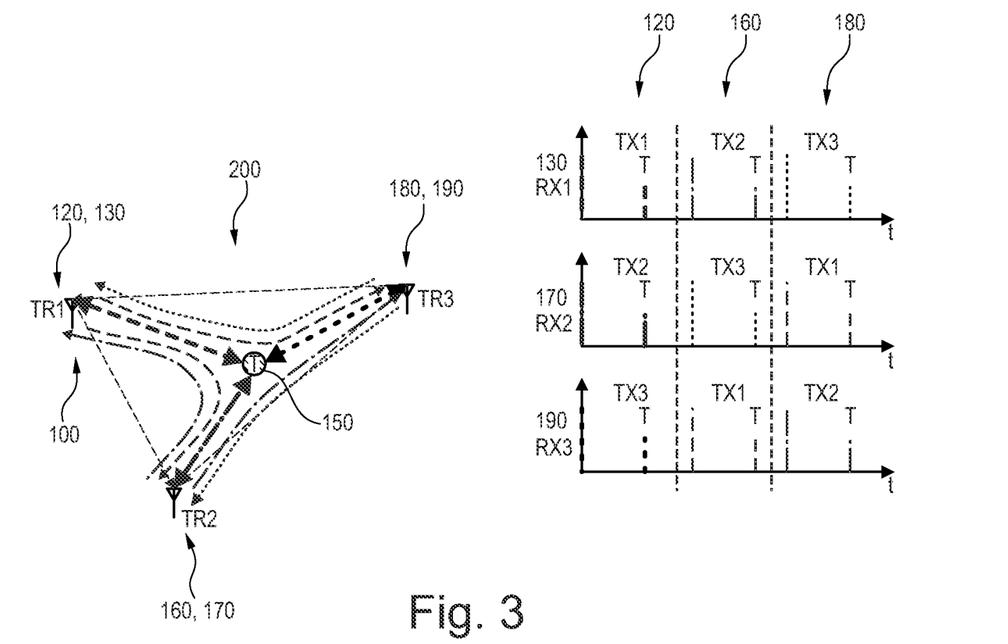
FIG. 3 illustrates a radar arrangement implemented as a mono-static application according to an exemplary embodiment of the present disclosure.

FIG. 3 illustrates a radar arrangement 200 according to an exemplary embodiment of the present disclosure implemented as a mono-static application. There are three mono-static radar devices (each comprising a transmitter and a receiver) in concurrent operation. To each device (transmitter/receiver pair), there is assigned a different transmitter-specific cyclic shift scheme, whereby, in this example, the transmitter and the receiver of each device uses the same transmitter-specific cyclic shift scheme. The mono-static devices are only interested in their own echo signal, and interferences can be avoided by the different transmitter-specific cyclic shift schemes.

Figure 4:
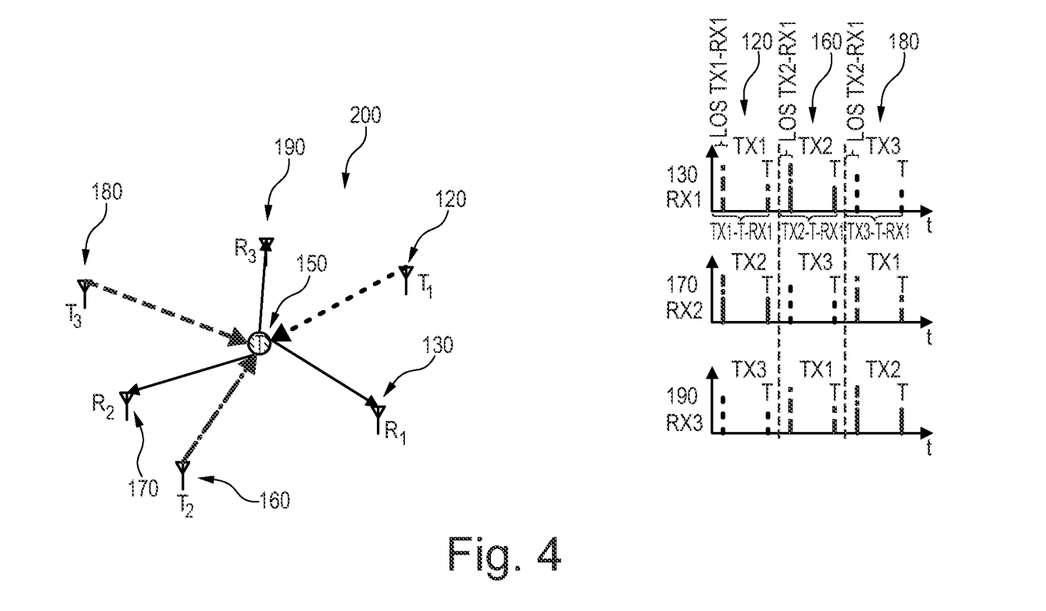
FIG. 4 illustrates a radar arrangement implemented as a multi-static application according to an exemplary embodiment of the present disclosure.

FIG. 4 illustrates a radar arrangement 200 implemented as a multi-static application according to an exemplary embodiment of the present disclosure. The multi-static application uses distributed transmitters and receivers to obtain different viewing aspect of the target 150. There are three transmitter devices 120, 160, 180 and three receiver devices 130, 170, 190 being spatially separated. To each transmitter device 120, 160, 180, there is assigned a different transmitter-specific cyclic shift scheme. The receiver devices 130, 170, 190 can either use any of the transmitter-specific cyclic shift schemes or all receiver devices 130, 170, 190 can use the same cyclic shift scheme. Each receiver 130, 170, 190 can receive the echo, separate, and identify the different transmitter-specific cyclic shift schemes of each transmitter device 120, 160, 180.

Figure 5:
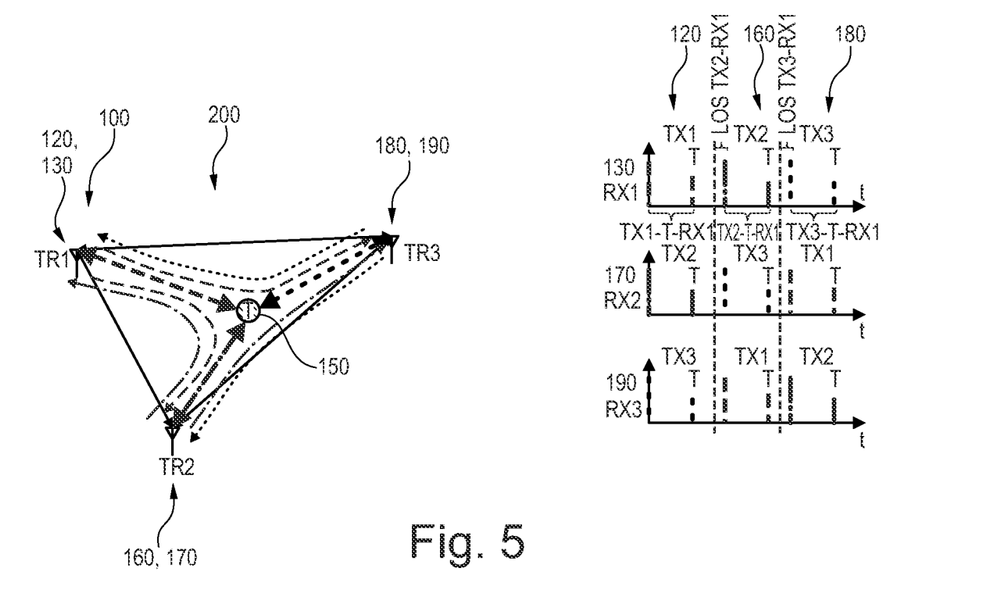
FIG. 5 illustrates a radar arrangement implemented as a statistical MIMO application according to an exemplary embodiment of the present disclosure.

FIG. 5 illustrates a radar arrangement implemented as a statistical MIMO application according to an exemplary embodiment of the present disclosure. The statistical MIMO application uses combined transmitter-receiver (pairs) on the target to obtain additional information. There are three radar devices (each comprising a transmitter and a receiver) in concurrent operation. To each device (transmitter/receiver pair), there is assigned a different transmitter-specific cyclic shift scheme. Each receiver 130, 170, 190 can separate the echo from each transmitter 120, 160, 180 based on the transmitter-specific cyclic shift scheme.

Figure 6:
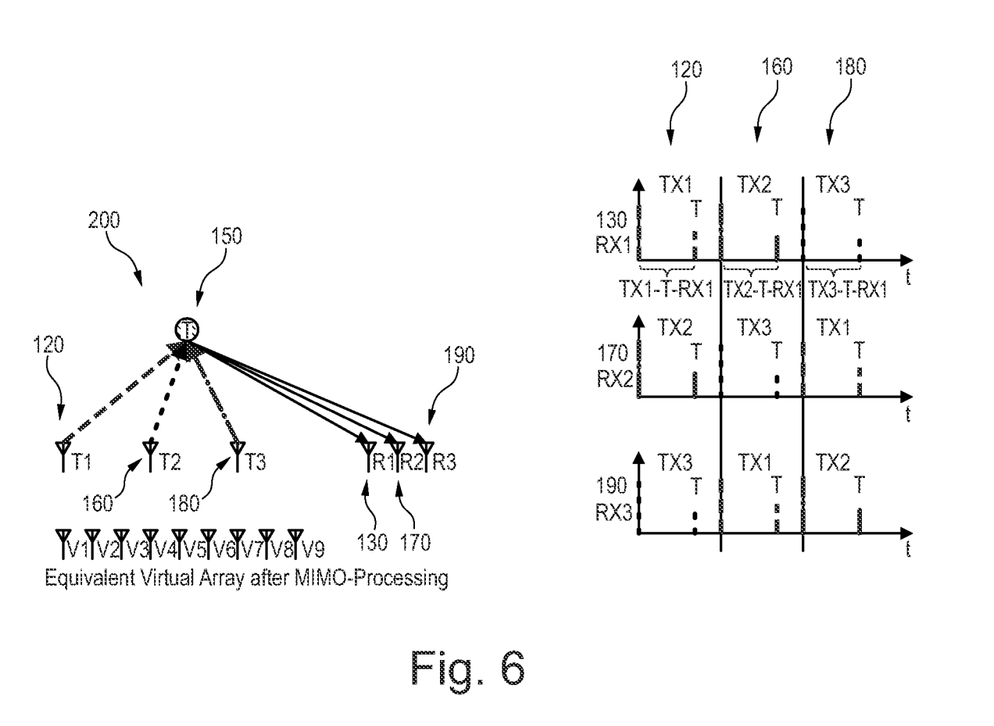
FIG. 6 illustrates a radar arrangement implemented as a coherent MIMO application according to an exemplary embodiment of the present disclosure.

FIG. 6 illustrates a radar arrangement implemented as a coherent MIMO (Virtual Array MIMO) application according to an exemplary embodiment of the present disclosure. The coherent MIMO application uses closely located transmitter-receivers (same viewing aspect of target 150) to enable calculation of virtual array antennas. There are three transmitter devices 120, 160, 180 and three receiver devices 130, 170, 190 being spatially separated. To each transmitter device 120, 160, 180, there is assigned a different transmitter-specific cyclic shift scheme. The receiver devices 130, 170, 190 can either use any of the transmitter-specific cyclic shift schemes or all receiver devices 130, 170, 190 can use the same cyclic shift scheme. Each receiver 130, 170, 190 can separate the echo from each transmitter 120, 160, 180 based on the transmitter-specific cyclic shift scheme.

Figure 7:
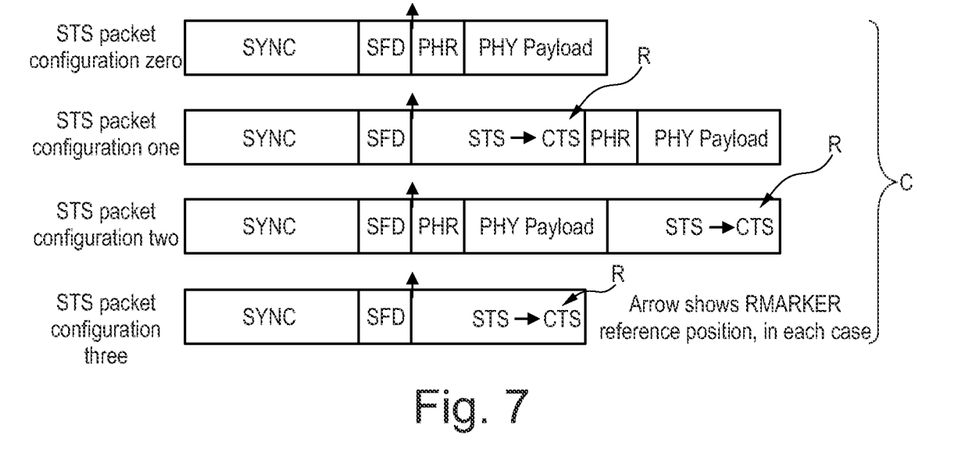
FIG. 7 illustrates training sequences for radar applications according to exemplary embodiments of the present disclosure.

FIG. 7 illustrates scrambled training sequences (STS) for ranging applications according to the IEEE 15.4z standard, which is modified according to an exemplary embodiment of the present disclosure. The sequences are arranged as packets and FIG. 7 shows four packet configurations. In this exemplary example, the HRP-ERDEV PPDU format with RMARKER position is applied. Besides the sequences "SYNC", "SFD", "PHR", and "PHY Payload", the packets can comprise the actual scrambled training sequence. In the first configuration (specifier 0), there is no STS field included in the PPDU. In the second configuration (1), the STS field is placed immediately after the SFD field and before the PHR field. In the third configuration (2), the STS field is placed after the PHY payload field. In the fourth configuration (3), the STS field is placed immediately after the SFD field and no PHR or data fields are included. Now, according to an exemplary embodiment of the present disclosure, the STS is substituted by a cyclic training sequence (CTS) that applies the described transmitter-specific cyclic-shift scheme (the plurality of regions are indicated as R, each packet can be seen as a code C). A further packet configuration may comprise only the CTS sequence.

Figure 8:
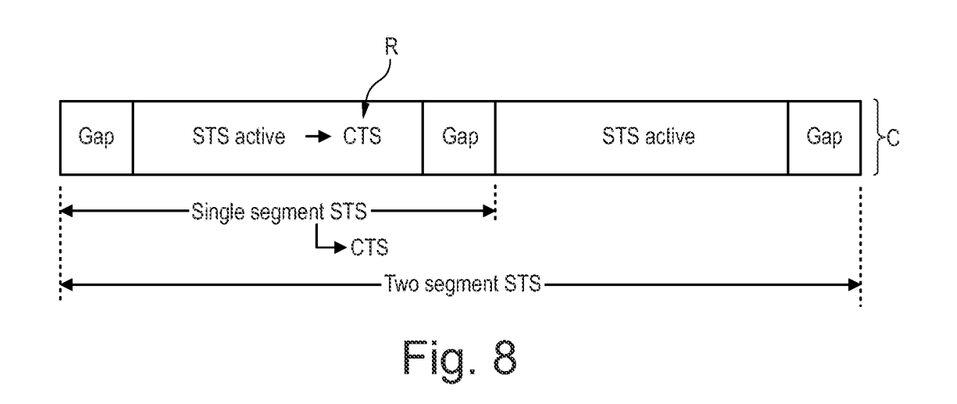
FIG. 8 illustrates a scrambled training sequence in more detail.

FIG. 8 illustrates the above described scrambled training sequence in more detail, i.e. there are gaps arranged between each active STS segment. In an exemplary embodiment of the present disclosure, at least one STS segment is substituted by a cyclically shifted CTS segment.

Figure 9:
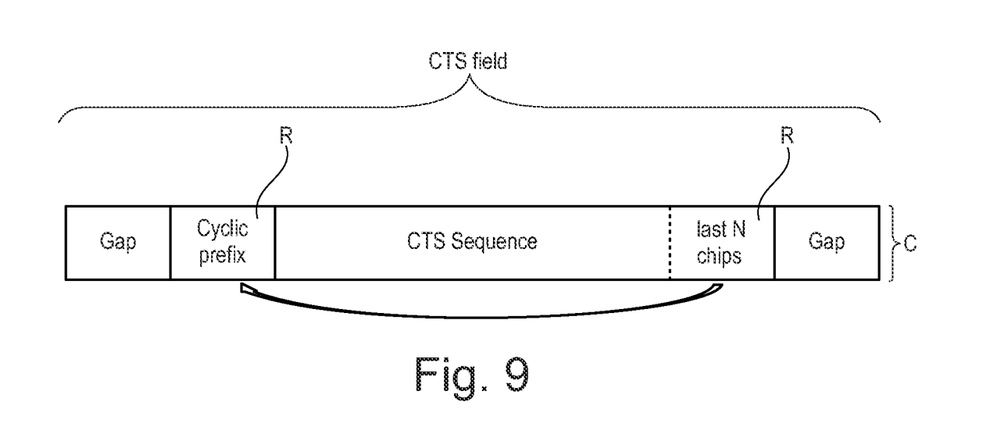
FIG. 9 illustrates a cyclic training sequence in more detail.

FIG. 9 illustrates the above described cyclic training sequence in more detail. The CTS segment (can be seen as code C) consists of three parts: i) a gap at the beginning and the end, ii) a cyclic prefix (at the beginning) with a repetition of the last N (a PHY PIB attribute in this example) chips of a sequence (at the end), and iii) a CTS sequence which is cyclically shifted by M (a PHY PIB attribute in this example)*N chips. In a specific embodiment of the present disclosure, the cyclic prefix segment and the "last N chips" segment are treated as a plurality of regions of code C and are re-arranged using a (transmitter-specific) cyclic-shift scheme.

In this specification, embodiments have been presented in terms of a selected set of details. However, a person of ordinary skill in the art would understand that many other embodiments may be practiced which include a different selected set of these details. It is intended that the following claims cover all possible embodiments.

REFERENCE NUMERALS

C Code to be transmitted
C' Received code
E Echo
O Output
R Region
S Signal
100 Radar system
110 Control unit
111 Antenna
112 Further antenna
120 Transmitter
130 Receiver
140 Correlator
150 Target
160 Further (second) transmitter
170 Further (second) transmitter
180 Third transmitter
190 Third receiver
200 Radar arrangement

What is claimed is:

1. A radar system, comprising:
   a transmitter configured to:
      provide a code comprising a first gap at a beginning, a second gap at an end, a cyclic prefix, an N chips segment following the cyclic prefix, and a training sequence;
      identify a plurality of regions within the code based on the cyclic prefix and the N chips segment;
      apply a transmitter-specific cyclic shift scheme to the plurality of regions;
      generate a signal from the code and transmit the signal; and
   a receiver, configured to:
      receive an echo of the signal; and
      identify the transmitter based on the transmitter-specific cyclic shift scheme.

2. The radar system according to claim 1, wherein the transmitter-specific cyclic shift scheme comprises arranging the regions of the code in a specific order, thereby providing a time offset to the regions.

3. The radar system according to claim 2,
wherein the code comprises a sequence of code symbols, and
wherein at least some of the plurality of regions are within at least one of the code symbols.

4. The radar system according to claim 2,
wherein the radar system is implemented as one of a monostatic radar application, a multi-static radar application, a statistical MIMO application, a coherent MIMO application.

5. The radar system according to claim 2, further comprising at least one of the following features:
wherein the transmitter and the receiver apply the same transmitter-specific cyclic shift scheme or a different cyclic shift scheme;
wherein the radar system is a pulse radar system;
wherein the radar system is configured for transmitting and receiving ultra-wide band, UWB, signals, and echoes thereof;
wherein a code symbol encodes a plurality of bits using a digital modulation scheme.

6. The radar system according to claim 2,
wherein the code comprises auto-correlation properties that reduce interference from other transmitters inside of a region of the plurality of regions.

7. The radar system according to claim 1,
wherein the code comprises a sequence of code symbols, and
wherein at least some of the plurality of regions are within at least one of the code symbols.

8. The radar system according to claim 1,
wherein the radar system is implemented as one of a monostatic radar application, a multi-static radar application, a statistical MIMO application, a coherent MIMO application.

9. The radar system according to claim 1, further comprising at least one of the following features:
wherein the transmitter and the receiver apply the same transmitter-specific cyclic shift scheme or a different cyclic shift scheme;
wherein the radar system is a pulse radar system;
wherein the radar system is configured for transmitting and receiving ultra-wide band, UWB, signals, and echoes thereof; and
wherein a code symbol encodes a plurality of bits using a digital modulation scheme.

10. The radar system according to claim 1,
wherein the code comprises auto-correlation properties that reduce interference from other transmitters inside of a region of the plurality of regions.

11. The radar system according to claim 1, further comprising:
a further transmitter configured to:
provide a further code,
identify a further plurality of regions within the further code,
apply a further transmitter-specific cyclic shift scheme to the further plurality of regions,
generate a further signal from the further code and transmit the further signal; and
a further receiver, configured to
receive at least one of:
the echo of the signal,
an echo of the further signal, and
identify at least one of:
the transmitter based on the transmitter-specific cyclic shift scheme, and
the further transmitter based on the further transmitter-specific cyclic shift scheme.

12. The radar system according to claim 11, comprising at least one of the following features:
wherein the transmitter-specific cyclic shift scheme is different from the further transmitter-specific cyclic shift scheme;
wherein the plurality of regions and the further plurality of regions are the same or different.

13. The radar system according to claim 11,
wherein the transmitter and the further transmitter are synchronized.

14. The radar system according to claim 11,
wherein the radar arrangement is implemented as one of the group which consists of a monostatic radar application, a multi-static radar application, a statistical MIMO application, a coherent MIMO application.

15. The radar system of claim 1, wherein the training sequence comprises a cyclic training sequence.

16. The radar system of claim 1, wherein the code is included in a packet configuration for transmission via the transmitter.

17. A method of performing a radar operation including a plurality of transmitters and receivers, the method comprising:
generating a code comprising a first gap at a beginning, a second gap at an end, a cyclic prefix, an N chips segment following the cyclic prefix, and a training sequence;
identifying a plurality of regions within the code based on the cyclic prefix and the N chips segment;
applying a transmitter-specific cyclic shift scheme to the plurality of regions;
generating a signal from the code and transmitting the signal;
receiving an echo of the signal; and
identifying a specific transmitter based on the transmitter-specific cyclic shift scheme.

18. The method according to claim 17, further comprising at least one of the following steps:
exchanging the transmitter-specific cyclic shift scheme within a transmitter-receiver pair;
broadcasting the transmitter-specific cyclic shift scheme to at least one of a transmitter and a receiver.

19. The method according to claim 17, further comprising:
updating the transmitter-specific cyclic shift scheme.

20. The method according to claim 19, wherein updating comprises changing the cyclic shift in a pseudo-random manner.

* * * * *